Feb. 26, 1946.  E. A. STALKER  2,395,513
AIRCRAFT
Filed Sept. 20, 1940  3 Sheets-Sheet 2
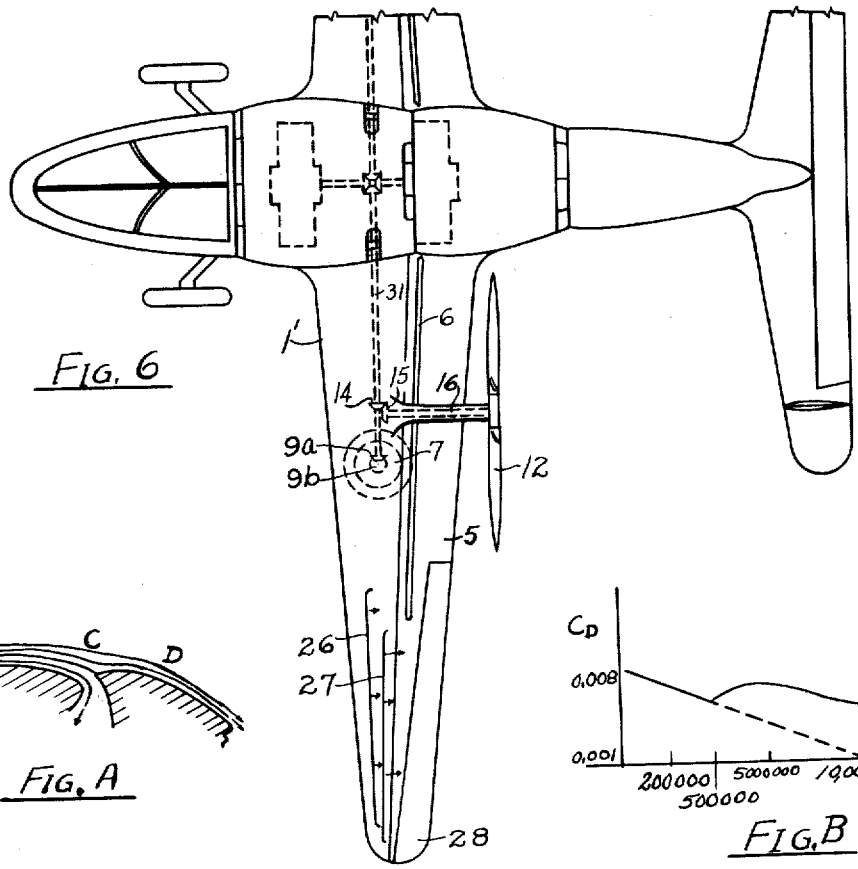
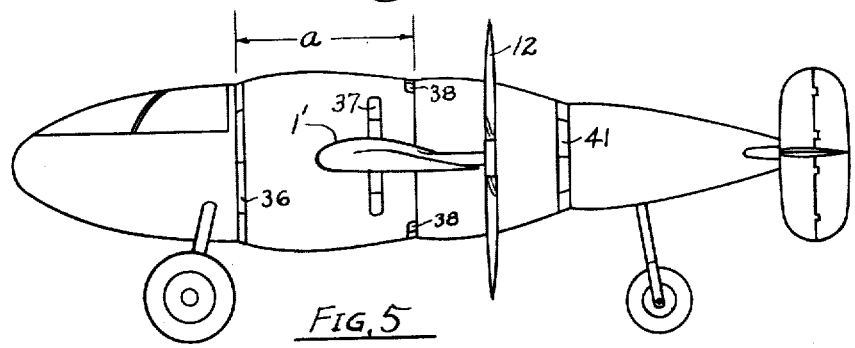
INVENTOR
Edward A. Stalker Feb. 26, 1946.  E. A. STALKER  2,395,513
AIRCRAFT
Filed Sept. 20, 1940   3 Sheets-Sheet 3

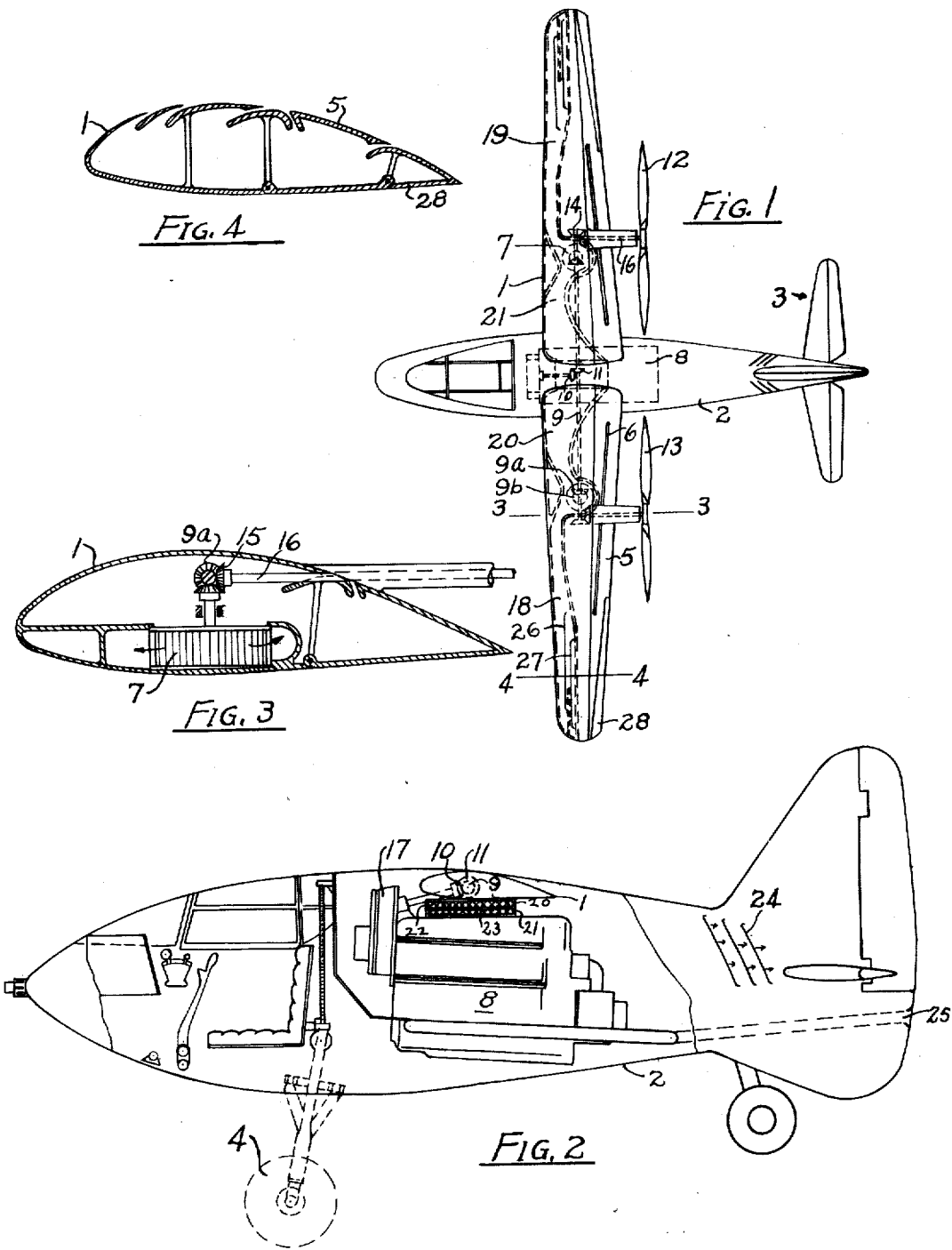

INVENTOR
Edward A. Stalker

Patented Feb. 26, 1946

2,395,513

UNITED STATES PATENT OFFICE 2,395,513

AIRCRAFT

Edward A. Stalker, Ann Arbor, Mich.

Application September 20, 1940, Serial No. 357,556

7 Claims. (Cl. 244—40)

My invention relates to aircraft and has for its objects, first to provide a safe means of utilizing the propellers to augment the lift of the wing; second to provide an efficient means of propelling an airplane, especially one having a high power for its size; third to provide a means of reducing the resistance of aircraft by a novel means of supplying the power plant with air. Other objects will appear from the specification and drawings.

In aircraft, and particularly military aircraft, very large powers are used for the size of the flying machine. A number of disadvantages accompany the advantages of large power. There is for instance the difficulty of balancing the aircraft longitudinally, that is, of obtaining the desired location of the center of gravity relative to the wing. Another disadvantage resides in the large torque of the engine which tends to roll the airplane in a direction opposite to that of the propeller rotation.

Still another disadvantage arises from the propeller which is called upon to absorb a very large power without having its blade tips greatly exceeding the velocity of sound. It is well known that exorbitant losses occur when the tip speed approaches this velocity.

In the present invention all of these difficulties are resolved as will appear from the description of the figures.

The aircraft incorporates a wing having slots in its surface through which fluid is directed to increase the lift and reduce the drag. In the case of changing the lift it is desirable that the power for driving the blowers to induce the slot flow be independent of the operation of the engines since landings must be effected with dead engines at times. The present invention provides that the blower is driven by two or more propellers acting as windmills. They are so arranged that if one is broken as, for instance, by gun fire the other will still function to drive the blower and will furnish sufficient power for it. The propellers are normally driven by the engine to propel the aircraft. Furthermore, a plurality of blowers and a plurality of propellers are provided whereby any propeller can drive any blower so that in the case of blower damage to one the others carry the load. This is again an important safety feature.

I accomplish the above objects by the means illustrated in the accompanying drawings in which—

Figures A and B pertain to the theory;

Figure 1 is a plan view of the aircraft;

Figure 2 is a side elevation partly in section;

Figure 3 is a vertical section along line 3—3 in Figure 1;

Figure 4 is a section along line 4—4 in Figure 1;

Figure 5 is another form of the invention shown in side view;

Figure 6 is a fragmentary top plan view;

Figure 7 is a front view of the aircraft of Figures 5 and 6;

Figure 8:
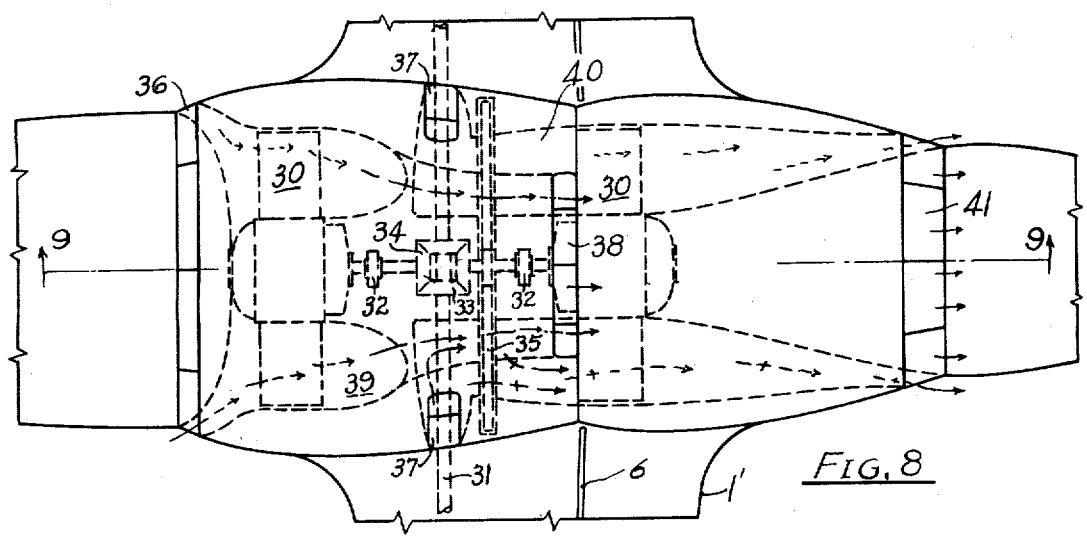
Figure 8 is a fragmentary top view of the fuselage drawn to a larger scale.

In the figures the wing is 1 and the fuselage is 2. The tail group is 3 and the landing gear is 4.

The wing has the flap 5 wherein there is an induction slot 6 for the intake of the boundary layer by the blowers 7. These blowers are driven by the engine 8 through the spanwise shaft 9 and the gears 10 and 11. The propellers 12 and 13 are also driven by this shaft by means of gears 14 and 15, the latter on the propeller shafts 16.

If the engine fails to supply power an overrunning clutch at 17 enclosed in the engine case automatically disengages the engine from shaft 9. That is, the clutch is purposely positioned between the engine and gear 10 rather than in shaft 16. When this situation occurs the propellers become windmills and drive the blowers 7. Preferably the pitch of the propellers is altered to improve their action as windmills.

The propellers are arranged to turn in opposite directions as may be noted from the gear relations and so there is no torque tending to roll the airplane. This is very significant for military airplanes because they have very large powers for their spans and the unsymmetrical lift along the span causes added drag while if the engine fails the airplane is unbalanced laterally for a small interval of time which may be disastrous if the machine is close to the ground. The propeller system of the invention eliminates these disadvantages and gives some advantages.

The propellers can be selected so as to run at tip speeds sufficiently slow to avoid the losses due to compressibility over the tip sections. This is not only because the rate of rotation can be reduced by the gearing as compared to the engine but also because the combined cross sections of the two tubes of flow through the propellers are greater than could be achieved with a single propeller of sufficiently large diameter to absorb the horse power. The large areas swept by the propellers also practically doubles the power realizable from the wind to drive the blowers.

The blowers discharge the inducted air in part through the ducts 18 and 19 and in part through the ducts 20 and 21. The latter turn downward below the lower surface of the wing inside the fuselage and contain radiators 22 and 23. The air is emitted from the fuselage through the slots 24.

The exhaust from the engine is emitted through the opening in the end of the exhaust pipe 25.

The wing slots 26 and 27 for discharging the air from the aircraft are shown at the wing tips but they could also be closer to the center of the machine. By placing them at the tips they serve also for lateral control. When the aileron 28 is deflected downward the slot flow aids in forcing the relative wind to follow the wind contour and produce added lift.

The form of the invention shown in Figures 5 to 11 discloses how two radial engines can be employed and yet means for the propellers to operate the blowers in the wings can be provided.

The wing is 1' and is the same as wing 1 except for the passage extending into the fuselage.

The engines 29 and 30 face each other with their shafts substantially in line, and each engine is connected to the spanwise shaft 31 by the clutches 32 and the gears 33 and 34. Between the clutch 32 and the gear 33 is the fan 35 for cooling the engines. It is operated by either engine since it lies between the clutch 32 and the gear 34 and so is always connected to the shaft 31 which is turned by either engine.

The propellers 12 and 13 are rotated by shaft 16 geared to shaft 31 by the gears 14 and 15. The blowers 7 are also geared to 31 by gears 9a and 9b.

When the engines fail to function the clutches disengage the engines and the propellers 12 and 13 rotate the blowers 7 and the fan 35. Hence even with the engines stopped air is inducted at slots 36 and 37 in the fuselage and discharged rearwards from the slots 38 and 41. The jets serve a useful purpose since they insure a smooth flow about the fuselage which results in a smooth and fast flow about the tail planes. They are then more powerful in their stabilizing and control actions.

It is also a feature of this invention that the wing is located near the vertical center of the fuselage so that no intermediate shaft and gearing is needed between the engine shaft and the spanwise shaft 31.

It is also a feature of this invention that the blowers are driven from the spanwise shaft 31 so that they may be located advantageously spanwise and also driven by the propellers acting as windmills unencumbered by the engines since each clutch will release a dead engine.

The cooling air for the engines is inducted through slots 36 and 37, the former extending along the full circumference and each of the latter extending only along a portion of the circumference.

The air for the front engine is conducted past the cylinders and to the discharge slot 38 by the duct 39. Passage 40 and discharge slot 41 serve the same purpose for the rear engine.

Figure 9:
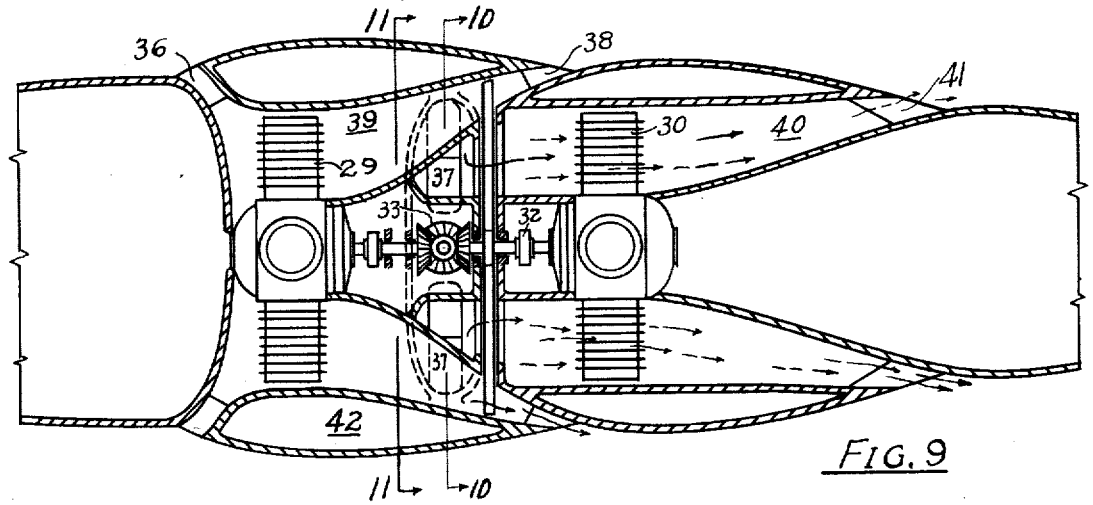
Figure 9 is a fragmentary vertical section taken along line 9—9 in Figure 1.
Figures 10, 11:
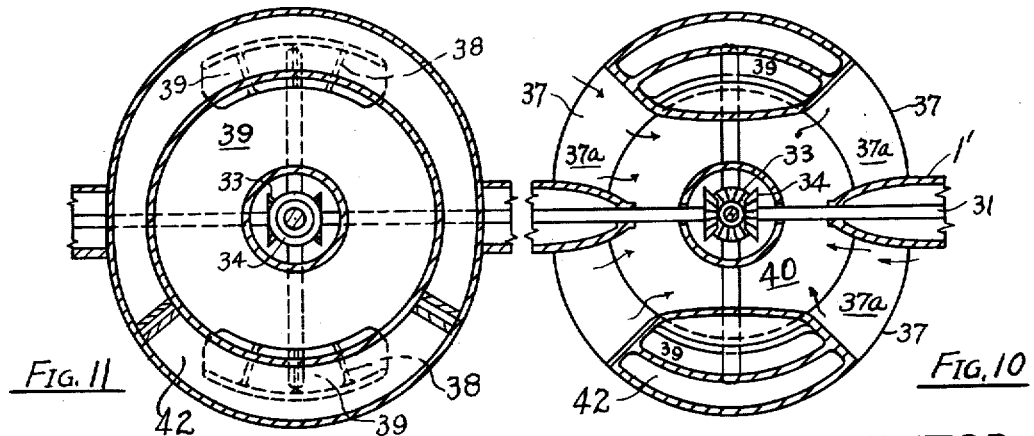
Figure 10 is a transverse section along line 10—10 in Figure 9.
Figure 11 is a transverse section along line 11—11 in Figure 9.

As shown particularly in Figures 9, 10 and 11 the fan 35 runs in annular openings in the inner walls of the ducts 39 and 40.

Figures 8 and 10 show how the duct 40 opens laterally to form the slots 37 in the sides of the fuselage. These figures show how the walls 37a curve outward to the fuselage exterior surface at the slots 37 and in fact forming walls of these slots.

In a military aircraft of great power it is a problem to achieve a satisfactory balance longitudinally because of the great weight and size of the power plant and because the gasoline load should also be near the center of gravity of the whole machine. The present invention provides an arrangement of engines and gas tanks such that balance is achieved with the gasoline very close to the machine's center of gravity. The consumption of fuel then does not disturb the balance of the machine.

A portion of the space allotted to gasoline and tanks can be given to other goods if desired. Bombs for instance could be carried—or any materials which are to be moved from one locality to another.

I use the term disposable load in the claims to refer to any material carried on the aircraft, said material being consumed or dropped while in flight—or constituting a load to be transported by the aircraft and disposed at its destination.

The tanks 42 are positioned so that their center of gravity is substantially between the engines as shown in Figures 9 and 10. They are thus close to the center of gravity of the whole machine. Preferably the tanks are constructed in two or more annular sections to permit removal for servicing of them and the power plant. In the present case the tanks form the lower half of the fuselage and the stresses are carried in the upper half which forms a continuous structure of the fuselage.

By the novel arrangement described an airplane is provided with a small frontal area, yet having a plurality of engines. Furthermore the whole power plant including tanks is very compact and hence a poor target. The arrangement makes a very effective military machine.

I provide radial engines aft of the cabin so that a major portion of the aft wall of the cabin can be protected from bullets.

It is to be noted that there is a saving in drag because of the air inducted for cooling the power plant. First the induction of the air is accomplished so as to reduce the drag of the fuselage. In the present day induction system the drag of the machine is increased since the induction openings are located so as to spoil the flow about the aircraft. In the present invention the spoilage drag is eliminated and the normal drag of the fuselage is reduced. Second the air is discharged in laminar sheets which causes less drag on the body than the normal turbulent flow of the atmosphere. Thus two purposes are served by the inducted air, that of cooling the power plants and that of reducing the drag.

It will be noted that the fuselage has a contour with reversals of curvature. The envelope of the body curves however has the shape of an ordinary streamline body. The reversals of curvature aid in the reduction of the drag.

A concavity can be defined in terms of the longitudinal tangent to the surfaces on opposite sides of the concavity. The points of contact should be spaced a substantial distance apart, a distance on each side greater than the narrowest width of the slot at the bottom of the concavity. A mere slot in the body surface does not constitute a concavity. The points of contacts of the tangent should also be further apart than the depth of the concavity below the tangent. This insures easy passage of the air into and out of the concavity.

In Figure A are shown the streamlines along a section of a body with a reversal of curvature. At the concavity C the streamlines diverge and destroy any turbulence in the boundary layer for the same underlying reasons as described for a converging nozzle in my U. S. Patent No. 2,041,794, Figure 4. At the bump as at D the streamlines converge and the change in velocity again destroys the turbulence. Hence the type of contour, by the two actions impressed on the flow, effectively eliminates turbulence in the boundary layer and reduces the drag. That is the flow is made laminar which furnishes a lower resistance than a turbulent flow.

Another explanation of the effect of the concavities can be given. On the surface of the body the air tends to lag behind the layers further out from the surface. When the lag becomes too great the boundary layer becomes turbulent and the drag magnified. If the suction increased progressively downstream and were a maximum on the surface the air particles which tend to lag behind would be subject to a greater accelerating force than the particles further out from the surface. Hence by eliminating the lag of the inner particles the flow is maintained in a laminar state.

A suction slot in the surface will give its maximum suction at the surface and will accelerate the air particles on the upstream side of the slot. This is favorable because it accelerates the particles which tend to lag. On the downstream side of the slot the slot suction pulls back on the air particles which already have a tendency to lag. This action is then unfavorable.

The favorable action ahead of the slot can be preserved and the unfavorable action aft of the slot destroyed if the surface aft of the slot is curved outward from the slot so that a suction is created downstream from the slot. This suction due to the surface contour offsets the suction from the slot. Then the flow will be made laminar for a greater length of the body or value of the Reynolds number.

The magnitude of the local Reynolds number is to be measured from the points where the boundary layer has zero thickness. The first such point is the stagnation point on the nose. The next point is at the suction slot where the boundary layer is removed.

It will be noticed from Figure B, which is constructed to log scales, that the drag coefficient at first declines with increasing Reynolds Number (RN) and then increases so that the values at 200,000 and 5,000,000 RN are substantially the same. Hence for minimum drag the spacing of the slots or concavities in the fuselage surface apparently should be such as to give local Reynolds Numbers between these values. Values of $C_D$ on the solid graph correspond to laminar flow up to about 500,000 and then to turbulent flow. This is true however only if laminar flow cannot be maintained beyond RN=500,000.

With concavities and slots in the surface it is however possible to compel the flow to remain laminar to values in excess of RN=10,000,000. The dotted line in Figure B indicates the downward trend of the drag coefficient with laminar flow maintained above RN=500,000. With the type of structure I described the laminar flow can be maintained. In this case the lower limit for RN should be 500,000 while the upper limiting value should exceed 10,000,000.

To preserve laminar flow the surface should be smooth and rigid and free of aimless irregularities.

Thus for best results the length between slots or concavities should preferably lie between $$a = \frac{200,000\nu}{V}$$

and $$a = \frac{14,000,000\nu}{V}$$

where $V$ is the flight speed and $\nu$ (nu) is the coefficient of kinematic viscosity. Under standard air conditions it has the value of 0.000159. For the claims $V$ is the landing speed.

The upper limit of "$a$" is made to depend on RN=14 million because then the value of $C_D$ has declined to practically its minimum value.

It will now be clear that I have devised an aircraft of novel form and great utility, providing among other things a safer and more efficient machine. It is safer because of the absence of any lateral unbalance from the engine torque if one of the engines fails and because of the great certainty of operation of any one of the blowers by any one of the propellers. It is more efficient because of the propeller arrangement and the method of cooling the engine in addition to the reduction in drag arising from the body shape and slots.

While I have described a specific form of the invention it is to be understood that I do not limit myself to these exact forms but intend to claim my invention broadly as indicated in the appended claims.

I claim:

1. In combination in an aircraft, a fuselage having an over-all streamline shape, said fuselage having a plurality of reversals of curvature in its surface extending over a major part of the circumference to produce a plurality of concavities disposed in spaced relation in the direction of the relative wind, a plurality of induction openings within said concavities, and means to induce spaced inward air flows therethrough into the fuselage interior, said concavities being spaced apart a distance whose magnitude lies between $$a = \frac{200,000\nu}{V}$$

and $$a = \frac{14,000,000\nu}{V}$$

where $V$ is the landing speed and $\nu$ is the coefficient of kinematic viscosity to maintain laminar flow and accompanying low drag over said fuselage.

2. In combination, in an aircraft, a fuselage, a power plant within the aircraft having a requirement for air, the exterior surface of said fuselage having a plurality of reversals of curvature to form a plurality of circumferential concavities disposed along the fuselage length, said surface having induction openings in the concavities extending around a substantial portion of the fuselage circumference, said concavities having such shape that a longitudinal tangent to the surfaces makes contact on opposite sides of a said opening with the surface at a distance from the adjacent side of the opening substantially greater than the narrowest width of said opening, and means to induce an inward flow through said openings, said reversals of curvature forming extradoses between openings to establish a substantially laminar flow on the fuselage surface.

3. In combination in an aircraft, a fuselage having an external surface with a reversal of curvature to form an arched surface having a plurality of extradoses on opposite sides of a circumferential concavity, said surface having an induction opening in the concavity extending around a major portion of the fuselage circumference said concavity being of such shape that, a longitudinal tangent to the surfaces of said concavity makes contact on opposite sides of said opening with said surfaces at a distance from the adjacent side of the opening substantially greater than the narrowest width of the opening, and means to induce a flow through the slot to induce the external flow to follow the surface, the extradoses of the arched surface adjacent to said opening serving to establish a substantially laminar flow.

4. In combination in an aircraft, a fuselage having an over-all generally streamline shape and having a plurality of reversals of curvature in its surface to produce a plurality of concavities disposed in the direction of the relative wind and extending over a major part of the circumference, the distance between the bottoms of two successive concavities being greater than $$a = \frac{200{,}000\nu}{V}$$

and less than $$a = \frac{14{,}000{,}000\nu}{V}$$

where $V$ is the landing speed, $\nu$ is the coefficient of kinematic viscosity both values being the foot pound second system, the extradoses between concavities establishing a substantially laminar flow on the fuselage surface, said concavities being so shaped that the longitudinal tangent to the surfaces on opposite sides of the concavity is of greater length than the depth of the concavity below said tangent.

5. In combination in an aircraft, a fuselage, two radial engines to propel the aircraft, said engines being housed in said fuselage and arranged with the power take-off ends of their crankshafts facing each other, openings in the fuselage surface ahead of and behind the forward engine, a duct communicating between said openings to house the cylinder of the forward engine, a blower located between said engines and operably connected thereto for rotation by either one thereof, a second set of openings in the fuselage aft of the first said openings and positioned ahead of and behind the rear engine, a second duct communicating between said second openings on opposite sides of the engine to house a cylinder of the rear engine, the discharge exit of said first duct lying aft of the inlet opening of said second duct.

6. In combination in an aircraft, a fuselage, a plurality of cooling surfaces disposed longitudinally of said fuselage, duct means within the aircraft for conducting a cooling flow past said cooling surfaces, said duct means having inlets disposed successively along the length of the aircraft to supply fresh air to each successive cooling surface and being adapted to direct the cooling air leaving a said forward cooling surface away from a succeeding cooling surface and to an exit in the aircraft surface, said duct means having portions thereof overlapping each other in annularly spaced relationship, and blower means operable in said overlapping portions and common to both said ducts for inducing flows therethrough.

7. In combination in an aircraft, means forming a plurality of separate ducts within the aircraft for the conduction of fluid in a plurality of separate flow streams, at least a portion of said ducts overlapping each other, engine means having cooling surfaces in said plurality of ducts adapted for cooling by the respective duct flows, a blower operably connected to said engine means and having blades in the overlapping portions of said ducts operating in common in more than one said duct to motivate said flow streams therethrough.

EDWARD A. STALKER.

---

Certificate of Correction

Patent No. 2,395,513. February 26, 1946.

EDWARD A. STALKER

It is hereby certified that errors appear in the printed specification of the above numbered patent requiring correction as follows: Page 1, second column, line 15, for "lint" read *line*; page 2, first column, line 20, for "wind", second occurrence, read *wing*; and second column, line 8, for "lead" read *load*; page 4, first column, line 12, claim 3, strike out the comma after "that" and insert the same after the syllable "ference", same line; and that the said Letters Patent should be read with these corrections therein that the same may conform to the record of the case in the Patent Office.

Signed and sealed this 7th day of May, A. D. 1946.

[SEAL]

LESLIE FRAZER,
*First Assistant Commissioner of Patents.* means to induce an inward flow through said openings, said reversals of curvature forming extradoses between openings to establish a substantially laminar flow on the fuselage surface.

3. In combination in an aircraft, a fuselage having an external surface with a reversal of curvature to form an arched surface having a plurality of extradoses on opposite sides of a circumferential concavity, said surface having an induction opening in the concavity extending around a major portion of the fuselage circumference said concavity being of such shape that, a longitudinal tangent to the surfaces of said concavity makes contact on opposite sides of said opening with said surfaces at a distance from the adjacent side of the opening substantially greater than the narrowest width of the opening, and means to induce a flow through the slot to induce the external flow to follow the surface, the extradoses of the arched surface adjacent to said opening serving to establish a substantially laminar flow.

4. In combination in an aircraft, a fuselage having an over-all generally streamline shape and having a plurality of reversals of curvature in its surface to produce a plurality of concavities disposed in the direction of the relative wind and extending over a major part of the circumference, the distance between the bottoms of two successive concavities being greater than $$a = \frac{200,000\nu}{V}$$

and less than $$a = \frac{14,000,000\nu}{V}$$

where V is the landing speed, $\nu$ is the coefficient of kinematic viscosity both values being the foot pound second system, the extradoses between concavities establishing a substantially laminar flow on the fuselage surface, said concavities being so shaped that the longitudinal tangent to the surfaces on opposite sides of the concavity is of greater length than the depth of the concavity below said tangent.

5. In combination in an aircraft, a fuselage, two radial engines to propel the aircraft, said engines being housed in said fuselage and arranged with the power take-off ends of their crankshafts facing each other, openings in the fuselage surface ahead of and behind the forward engine, a duct communicating between said openings to house the cylinder of the forward engine, a blower located between said engines and operably connected thereto for rotation by either one thereof, a second set of openings in the fuselage aft of the first said openings and positioned ahead of and behind the rear engine, a second duct communicating between said second openings on opposite sides of the engine to house a cylinder of the rear engine, the discharge exit of said first duct lying aft of the inlet opening of said second duct.

6. In combination in an aircraft, a fuselage, a plurality of cooling surfaces disposed longitudinally of said fuselage, duct means within the aircraft for conducting a cooling flow past said cooling surfaces, said duct means having inlets disposed successively along the length of the aircraft to supply fresh air to each successive cooling surface and being adapted to direct the cooling air leaving a said forward cooling surface away from a succeeding cooling surface and to an exit in the aircraft surface, said duct means having portions thereof overlapping each other in annularly spaced relationship, and blower means operable in said overlapping portions and common to both said ducts for inducing flows therethrough.

7. In combination in an aircraft, means forming a plurality of separate ducts within the aircraft for the conduction of fluid in a plurality of separate flow streams, at least a portion of said ducts overlapping each other, engine means having cooling surfaces in said plurality of ducts adapted for cooling by the respective duct flows, a blower operably connected to said engine means and having blades in the overlapping portions of said ducts operating in common in more than one said duct to motivate said flow streams therethrough.

EDWARD A. STALKER.

Certificate of Correction

Patent No. 2,395,513.

February 26, 1946.

EDWARD A. STALKER

It is hereby certified that errors appear in the printed specification of the above numbered patent requiring correction as follows: Page 1, second column, line 15, for "lint" read *line*; page 2, first column, line 20, for "wind", second occurrence, read *wing*; and second column, line 8, for "lead" read *load*; page 4, first column, line 12, claim 3, strike out the comma after "that" and insert the same after the syllable "ference", same line; and that the said Letters Patent should be read with these corrections therein that the same may conform to the record of the case in the Patent Office.

Signed and sealed this 7th day of May, A. D. 1946.

[SEAL]

LESLIE FRAZER,
*First Assistant Commissioner of Patents.*